June 18, 1963     P. C. VANDER AREND     3,094,390
PRODUCTION AND STORAGE OF CONVERTED HYDROGEN
Filed July 9, 1958
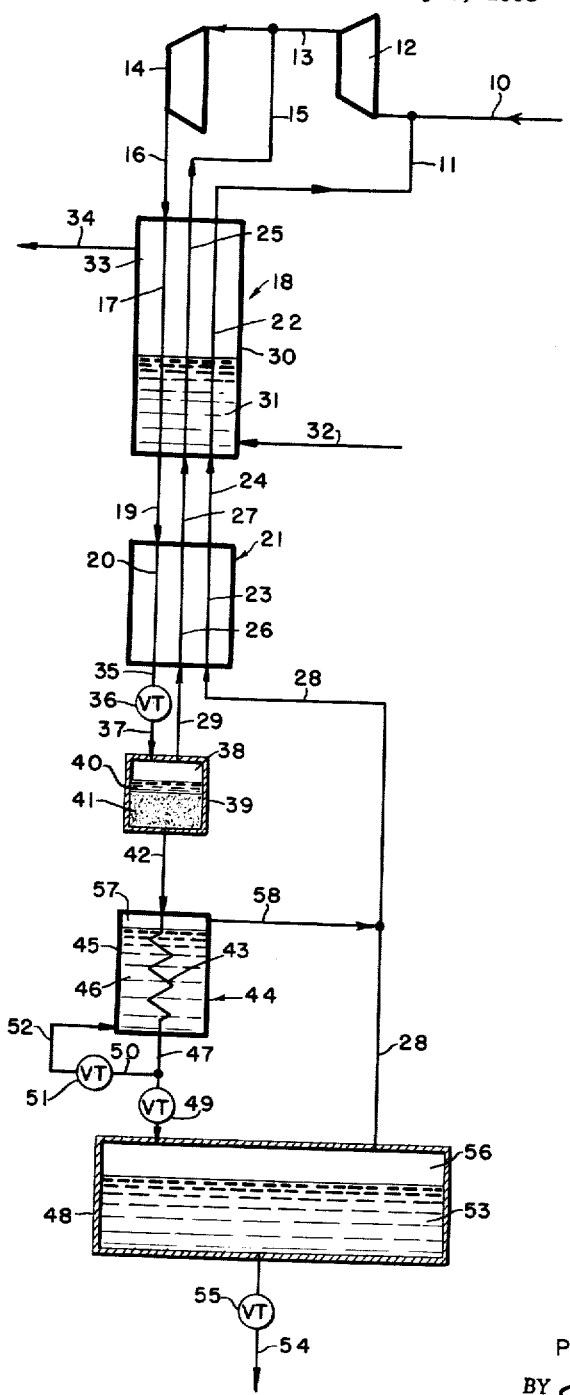
INVENTOR.
PETER C. VANDER AREND
BY Shanley & O'Neil
ATTORNEY

United States Patent Office 3,094,390
Patented June 18, 1963

3,094,390
PRODUCTION AND STORAGE OF CONVERTED HYDROGEN
Peter C. Vander Arend, Allentown, Pa., assignor, by mesne assignments, to Air Products and Chemicals, Inc., Trexlertown, Pa., a corporation of Delaware
Filed July 9, 1958, Ser. No. 747,546
7 Claims. (Cl. 23—210)

This invention relates to the liquefaction of hydrogen and more particularly to a novel method of and apparatus for producing and storing liquid hydrogen of high para concentration.

It is known that normal hydrogen is a mixture of two gases referred to as ortho hydrogen and para hydrogen and that the equilibrium concentration of ortho hydrogen and para hydrogen varies with temperature. At temperature above about −100° F. normal hydrogen exists, that is hydrogen having an equilibrium composition of 75% ortho hydrogen and 25% para hydrogen, while at lower temperatures the equilibrium composition is such that the concentrations of para hydrogen increase with decrease in temperature, the para hydrogen concentration gradually increasing from about 25% to about 38% as the temperature decreases from about −100° F. to about −280° F. and then rapidly increases to about 100% para hydrogen as the temperature further decreases to the boiling point of hydrogen at atmospheric pressure. Thus, liquefied normal hydrogen under atmospheric pressure undergoes autogenous conversion of ortho hydrogen to para hydrogen until an equilibrium composition of about 100% para hydrogen is established. It is also known that ortho hydrogen conversion is an exothermic reaction releasing about 457 B.t.u.'s per pound mol upon conversion of normal hydrogen to 100% para hydrogen at about −422° F. and that autogenous conversion of ortho hydrogen to para hydrogen is not instantaneous and requires an appreciable time interval for its completion. Since the heat of ortho hydrogen conversion is greater than the heat of vaporization of hydrogen at atmospheric pressure, liquid hydrogen will continuously vaporize until 100% para hydrogen composition is reached. The percentage of liquid hydrogen that is lost by vaporization is a function of the ortho hydrogen composition of the liquid hydrogen at the time ortho hydrogen conversion begins and the degree of completeness of conversion of ortho hydrogen to para hydrogen, that is, the storage period.

It has been proposed in the past to accelerate conversion of ortho hydrogen to para hydrogen by the use of a catalyst placed in the liquid receiving zone of the hydrogen liquefier in intimate contact with liquefied hydrogen under atmospheric pressure. Although the power required to produce a given quantity of liquid hydrogen of high para concentration by catalytic conversion at atmospheric pressure is substantially the same as the power required to produce the same quantity of liquid hydrogen of similar para hydrogen concentration when autogenous ortho hydrogen conversion takes place, this arrangement makes it possible to produce liquid hydrogen of high para concentration which may be stored at atmospheric pressure without appreciable liquid loss due to autogenous conversion.

In the copending application of Duffer B. Crawford, Serial No. 746,050, filed July 1, 1958 for "Method and Apparatus for Liquefying Gases," there is disclosed a hydrogen liquefaction and conversion cycle in which vaporization of liquefied gas under superatmospheric pressure is effected by heat generated by catalytic conversion of ortho hydrogen to para hydrogen and the total energy of the vapor is utilized to reduce the overall power requirements of the cycle. While this cycle is capable of producing liquid hydrogen of high para concentration at materially reduced cost as compared to prior arrangements, the ultimate cost of the product remains high due to liquid lost by factors other than by autogenous conversion of ortho hydrogen. In particular, the thermal efficiency of storage vessels and of transmission lines, which may be of substantial length due to the necessity of locating the liquefier and the storage vessel a substantial distance apart, are primary factors which result in vaporization of converted liquid hydrogen and materially influence the ultimate cost of the product.

It is therefore an object of the present invention to provide a novel method of and apparatus for producing and storing liquefied hydrogen of high para concentration.

Another object is to provide a novel method of and apparatus for producing and storing converted liquefied hydrogen by which losses resulting from vaporization are reduced to a minimum.

Still another object of the present invention is to provide a novel method of and apparatus for producing converted liquid hydrogen and for transferring with a minimum vaporization loss converted liquid hydrogen to a storage vessel that may be located a substantial distance from the hydrogen liquefier.

A still further object is to provide a novel method of and apparatus for producing and storing liquid hydrogen of high para concentration in such a manner as to materially reduce the ultimate cost per mol of liquid hydrogen utilized.

The foregoing and other objects and features of the present invention will appear more fully from the following detailed description considered in connection with the accompanying drawing, the single FIGURE of which discloses a hydrogen liquefaction and storage cycle constructed in accordance with the principles of the present invention. It is to be expressly understood, however, that the drawing is designed for purposes of illustration only and not as a definition of the limits of the invention, reference for the latter purpose being had to the appended claims.

In accordance with the principles of the present invention, liquid hydrogen is subject to catalytic treatment while under superatmospheric pressure to effect conversion of ortho hydrogen to para hydrogen and the converted liquid hydrogen is subcooled and transmitted while under superatmospheric pressure to a vessel for storage under atmospheric or superatmospheric pressure. The present invention also provides an arrangement in which hydrogen vapor withdrawn from the storage vessel is returned to the hydrogen liquefaction cycle in such a manner as to decrease the power requirements. The withdrawn hydrogen vapor may be utilized to refrigerate the hydrogen feed of the hydrogen liquefier and/or for increasing the para hydrogen concentration of hydrogen feed. Subcooling of converted hydrogen may be effected by establishing heat exchange effecting relation with expanded liquid converted hydrogen, and the vapor resulting from the subcooling may be utilized with vapor withdrawn from the storage vessel for reducing the power requirements as discussed above.

With reference to the drawing, a hydrogen liquefaction and storage cycle embodying the principles of the present invention is disclosed therein with a stream of normal hydrogen at atmospheric temperature and pressure and free of moisture and other condensables including oxygen and nitrogen being fed to the cycle through conduit 10. The hydrogen conducted by the conduit 10 is merged with a stream of gaseous hydrogen of high para concentration at substantially atmospheric temperature and pressure in conduit 11, the gaseous hydrogen stream of high para concentration being derived from the process in the manner described below. The merged streams are passed through a first stage compressor 12 by which the pressure is increased to a superatmospheric pressure below the critical pressure of hydrogen which may be referred to as an intermediate pressure. The hydrogen stream under intermediate pressure is conducted by conduit 13 to the inlet of a second stage compressor 14 together with a stream of gaseous hydrogen under the intermediate pressure passed by conduit 15 connected to the conduit 13, the stream of gaseous hydrogen in the conduit 15 having a para concentration greater than normal and being derived from the process in a manner described below. The stream of hydrogen gas fed to the compressor 14 from the conduits 10, 11 and 15 is compressed to a relatively high pressure as required for partial liquefaction described below and comprises hydrogen feed as well as refrigeration fluid of the cycle. The high pressure hydrogen gas from compressor 14 is cooled to a relatively low temperature by heat exchange relation with gaseous hydrogen passed by conduits 11 and 15 and with extraneous refrigeration. As shown, the high pressure hydrogen gas is conducted by conduit 16 to pass 17 of a multi-pass heat exchange device 18 and from the cold end of the pass 17 through conduit 19 to pass 20 of a multi-stage heat exchange device 21. The heat exchange devices 18 and 21 include passes 22 and 23, respectively, connected in series by conduit 24 and passes 25 and 26, respectively, connected in series by conduit 27, through which relatively cold gaseous hydrogen at atmospheric pressure and at the intermediate pressure, respectively, flow in countercurrent heat exchange effecting relation with the high pressure hydrogen gas. The conduits 11 and 15 are respectively connected to the warm ends of the passes 22 and 25 of the heat exchange device 18 and cold gaseous hydrogen at atmospheric pressure and at the intermediate pressure are fed by conduits 28 and 29 to passes 23 and 26, respectively, at the cold end of the heat exchange device 21. Heat exchange device 18 may include a shell 30 defining a chamber enclosing the heat exchange passes 17, 22 and 25 and may include a liquid receiving zone containing a pool of liquid refrigerant 31, such as nitrogen for example, fed thereto by way of a conduit 32 from a source not shown and a vapor zone 33 connected to a conduit 34. If desired the conduit 34 may be connected to a region of subatmospheric pressure. Cooled high pressure hydrogen is withdrawn from the pass 20 at the cold end of the heat exchange device 21 and is conducted by conduit 35 to an expansion valve 36 by which its pressure is reduced to an intermediate superatmospheric pressure, the effluent of the expansion step being introduced by conduit 37 into a chamber 38 defined by vessel 39. The temperature and pressure conditions existing downstream of the expansion valve 36 are such that a portion of the hydrogen entering the chamber 38 is in liquid phase, the liquefied hydrogen collecting in a pool 40. A catalyst 41 of the type capable of accelerating conversion of ortho hydrogen to para hydrogen is located within the chamber 38 in intimate contact with the liquid hydrogen collected in the pool 40. The catalyst 41 may comprise a mass or bed of small particles of any one of a number of known materials capable of accelerating conversion of ortho hydrogen, such as ferric hydroxide, for example.

Catalytically converted hydrogen in liquid phase is withdrawn from the chamber 38 by way of a conduit 42 and conducted through pass 43 of heat exchange device 44. The heat exchange device 44 includes a shell 45 containing a pool of liquefied gas 46 surrounding the pass 43. The liquefied gas forming the pool 46 boils at a temperature lower than the temperature of converted liquefied hydrogen flowing through the pass 43 and subcooled converted liquid hydrogen emerges from the path 43 in conduit 47. The conduit 47 conducts subcooled converted liquid hydrogen to a storage vessel 48, an expansion valve 49 being included in the conduit 47. Although not apparent from the drawings, the storage vessel 48 may, by necessity, be located a substantial distance from the hydrogen liquefier and the conduit 47 may comprise a liquid transmission line of substantial length. Also, the expansion valve 49 is preferably located in close proximity with the storage vessel. A source of subcooling liquid collecting in the pool 46 of the heat exchange device 44 may be obtained by withdrawing through conduit 50 a portion of the liquid hydrogen passing through conduit 47, expanding to a lower pressure the withdrawn liquid hydrogen in valve 51 and then introducing expanded liquid hydrogen into the shell of the heat exchange device 44 through conduit 52. Converted liquid hydrogen collecting in a pool 53 in the storage vessel 48 may be withdrawn therefrom through conduit 54 provided with a control valve 55. The conduit 28 connected to pass 23 of heat exchange device 21 is also connected to the storage vessel 48 and communicates with the vapor space 56 thereof. The vapor space 57 of the heat exchange device 44 is connected through conduit 58 to the conduit 28.

In operation, a stream of normal hydrogen, that is 25% para hydrogen and 75% ortho hydrogen, free of moisture and other impurities and condensables, enters the cycle through conduit 10 at substantially atmospheric temperature and pressure, the stream of normal hydrogen being mixed with a stream of hydrogen vapor in conduit 11 and the combined streams being compressed in the compressor 12 to an intermediate pressure of 80 p.s.i.a., for example. Compressed hydrogen from the compressor 12 and hydrogen vapor under the intermediate pressure in conduit 15 are compressed in the compressor 14 to a high pressure of 1500 p.s.i.a., for example. The stream of high pressure hydrogen gas enters the pass 17 in heat exchange device 18 at about 80° F. and is cooled while flowing therethrough to about −343° F., the refrigerant in the pool 31 being liquid nitrogen boiling under a pressure of about 2 p.s.i.a. The high pressure hydrogen gas is further cooled to about −387° F. upon flowing through the heat exchange device 21 and is then expanded to about 80 p.s.i.a. in the valve 36 and further cooled to about −410° F. with about 30%, for example, of the hydrogen being in liquid phase. At an intermediate pressure of 80 p.s.i.a. the temperature of the liquid hydrogen in pool 40 is about −410° F. and the catalyst 41 effects accelerated conversion of ortho hydrogen to establish an equilibrium composition as high as 97% para hydrogen depending upon the catalytic efficiency and the residence time. The heat of conversion results in vaporization of about 50% of the liquid hydrogen in the vessel 39 and about 17% of the hydrogen entering the vessel 39 is withdrawn from the chamber 38 by conduit 42 as liquid hydrogen of high para concentration. Catalytically converted liquid hydrogen is cooled to about −422° F. upon flowing through the pass 43 of the heat exchange device 44 in heat exchange effecting relation with liquid hydrogen in the pool 46 boiling at a temperature of about −422° F. following expansion in valve 50 to about atmospheric pressure. Subcooled converted liquid hydrogen is then expanded in the valve 49 to atmospheric pressure and introduced into the storage vessel 48 from which it may be withdrawn as desired through conduit 54. Vapor withdrawn from the storage vessel 48 and vapor from the subcooling heat exchanger 44 in conduit 58 are merged and passed in conduit 28 for flow through passes 23 and 22 of heat exchange devices 21 and 18, respectively, in countercurrent heat exchange effecting relation with the high pressure hydrogen stream. Warmed hydrogen emerging from the pass 22 is conducted by the conduit 11 to the inlet of the first stage compressor 12. Hydrogen vapor under a pressure of about 80 p.s.i.a., comprising unliquefied hydrogen gas fed to the vessel 39 and liquid hydrogen vaporized by the heat of conversion, is withdrawn from the vessel 39 and conducted through passes 26 and 23 of the heat exchange devices 21 and 18 in countercurrent heat exchange relation with the high pressure hydrogen gas and then conducted by conduit 15 to the inlet of compressor 14.

The converted liquid hydrogen withdrawn from the vessel 39 may have a para concentration as high as 97% and high para concentrations may be obtained by operating the cycle with higher conversion pressures. Thus liquid introduced into the storage vessel 48 has a correspondingly high para concentration and liquid lost by vaporization due to the heat of autogenic conversion of the liquid in the storage vessel is relatively small. However, the storage vessel 48 is not prefectly insulated and a portion of the liquid hydrogen stored therein will be lost by vaporization due to heat infiltration through the walls of the storage vessel. In addition, the transmission line 47 between the subcooling heat exchanger 44 and the storage vessel 48, which may be of substantial length, likewise is not provided with perfect insulation and the liquid product will be heated during its passage from the subcooling heat exchanger to the storage vessel and a portion of the liquid product will be vaporized after entering the storage vessel. In accordance with the principles of the present invention, hydrogen vapor collecting in the storage vessel resulting from vaporization of converted liquid hydrogen product in the transmission line 47 and in the storage vessel 48 due primarily to heat infiltration and slightly to autogenic conversion, is returned to the hydrogen liquefaction cycle and utilized therein to reduce the power required per mol of product. This is accomplished by passing hydrogen vapor withdrawn from the storage vessel through conduit 28 and passes 23 and 22 of the heat exchange devices 21 and 18, respectively, and by recycling the warm hydrogen vapor. Hydrogen vapor withdrawn from the storage vessel is slightly warmed upon flowing through the conduit 28 and is introduced into the hydrogen liquefaction cycle for heat exchange with the high pressure hydrogen gas at the proper temperature level, such as at the cold end of the heat exchange device 21 as shown. The hydrogen vapor gives up its cold to the incoming high pressure hydrogen gas and thereby reduces the power required for cooling the hydrogen to the low temperature required for liquefaction. The withdrawn hydrogen vapor is of high para concentration, such as the order of 97% for example, and the addition of this vapor to the hydrogen introduced to the high pressure compressor 14 increases the para concentration of the hydrogen gas fed to the liquefaction cycle and decreases the degree of ortho hydrogen conversion necessary to establish the desired para concentration. As a consequence less liquid hydrogen is vaporized by the heat of conversion and the total power required is reduced a corresponding degree. In order to decrease vaporization of converted hydrogen during its passage through the transmission line 47 from the hydrogen liquefier to the storage vessel the present invention provides an arrangement for so passing converted liquid hydrogen in subcooled condition and under a superatmospheric pressure greater than the pressure existing in the storage vessel, such as at the conversion pressure, for example. The feature of passing converted liquid hydrogen from the hydrogen liquefier to the storage vessel under superatmospheric pressure makes it possible to utilize smaller transmission lines than would be required for product under atmospheric pressure. The reduction in size of the transmission line reduces heat losses and this concept, together with the feature of subcooling the converted liquid hydrogen, substantially eliminates liquid loss by vaporization in its passage from the liquefier to the storage vessel. Subcooling of converted liquid hydrogen also reduces the percentage of liquid flashed in the expansion valve 49.

It is also contemplated by the present invention to utilize the total energy and high para concentration of hydrogen vapor evolved during the subcooling step. For this purpose the conduit 58 forms a connection between the vapor space 57 of the subcooler heat exchanger 44 and the conduit 28 so that the hydrogen vapor from the subcooler heat exchanger is passed in countercurrent heat exchange effecting relation with the high pressure hydrogen gas and is recycled to form a part of the hydrogen gas fed to the liquefier.

In some cases it may be desirable because of certain characteristics of the installation for example, to pass hydrogen vapor withdrawn from the storage vessel and from the subcooling heat exchanger directly to the low pressure compressor. In such case while the hydrogen vapor is not used as a refrigerant a substantial power saving is realized since the para concentration of the hydrogen gas fed to the liquefaction cycle is substantially increased. In cases where it is desirable to utilize the total energy of hydrogen vapor withdrawn from the storage vessel and from the subcooling heat exchanger to reduce the power required for cooling the hydrogen gas to the required low temperature, the hydrogen vapor, as mentioned above, is introduced at the proper temperature level into the hydrogen liquefaction cycle. In some cases the hydrogen vapor may be introduced at a point of heat interchange with high pressure gas prior to its expansion to the conversion pressure as illustrated in the drawing, while in other cases the hydrogen vapor may be first passed in heat interchange with converted liquid hydrogen, that is, heat interchange may be established between conduits 42 and 28. Furthermore, although the drawing illustrates an arrangement in which converted liquid hydrogen is stored at atmospheric pressure it is to be understood that storage may be maintained at superatmospheric pressure if desired. For example, the expansion valve 49 may be set to reduce the liquid hydrogen to a superatmospheric pressure less than the conversion pressure and hydrogen vapor withdrawn from the storage vessel may be expanded to atmospheric pressure after its return to the liquefaction cycle, before or after heat interchange with hydrogen gas, or a third stage compressor operating at the storage vessel pressure may be employed. Moreover, converted liquid hydrogen fed to the subcooling heat exchanger may be expanded in valve 51 to atmospheric pressure or to a superatmospheric pressure.

There is thus provided by the present invention a novel method of and apparatus for producing and storing liquid hydrogen of high para concentration with less cost per mol of utilized product than that obtainable by prior systems. The power saving is accomplished by utilizing the total energy and high para concentration of hydrogen vapor present in the storage vessel for reducing power requirements of a hydrogen liquefier including catalytic conversion. Also, vapor losses in transmitting converted liquid hydrogen from the liquefier to the storage vessel, which may comprise a substantial distance, are materially reduced by transmitting the product in subcooled condition under superatmospheric pressure.

Although one embodiment of the invention is disclosed and described herein, it is to be expressly understood that various changes and substitutions may be made therein without departing from the spirit of the invention as well understood by those skilled in the art. Reference therefore will be had to the appended claims for a definition of the limits of the invention.

What is claimed is:

1. Method of producing and storing liquid hydrogen which comprises providing a stream of compressed hydrogen, cooling the compressed hydrogen in a heat exchange zone and expanding the cooled hydrogen to provide liquid hydrogen under superatmospheric pressure, catalytically converting liquid hydrogen while under superatmospheric pressure to accelerate conversion of ortho hydrogen to para hydrogen and provide converted liquid hydrogen of high para concentration under superatmospheric pressure, transferring converted liquid hydrogen under superatmospheric pressure to adjacent a storage vessel, expanding transferred converted liquid hydrogen to a lower pressure, introducing expanded converted liquid hydrogen into the storage vessel, withdrawing hydrogen vapor from the storage vessel, transferring withdrawn hydrogen vapor to the heat exchange zone and passing the withdrawn hydrogen vapor through the heat exchange zone in heat interchange with compressed hydrogen and then compressing the hydrogen vapor to form a portion of the stream of compressed hydrogen.

2. Method of producing and storing liquid hydrogen which comprises providing a stream of compressed hydrogen, cooling the compressed hydrogen in a heat exchange zone and expanding the cooled hydrogen to provide liquid hydrogen under superatmospheric pressure, catalytically converting liquid hydrogen while under superatmospheric pressure to accelerate conversion of ortho hydrogen to para hydrogen and provide converted liquid hydrogen of high para concentration under superatmospheric pressure, subcooling converted liquid hydrogen under superatmospheric pressure, transferring subcooled converted liquid hydrogen under superatmospheric pressure to adjacent a storage vessel, expanding transferred subcooled converted liquid hydrogen to a lower pressure, introducing expanded converted liquid hydrogen into the storage vessel, withdrawing hydrogen vapor from the storage vessel, transferring withdrawn hydrogen vapor to the heat exchange zone and passing the withdrawn hydrogen vapor through the heat exchange zone in countercurrent heat interchange with compressed hydrogen and then compressing the hydrogen vapor to form a portion of the stream of compressed hydrogen.

3. Method of producing and storing liquid hydrogen as defined in claim 2 in which the converted liquid hydrogen under superatmospheric pressure is passed in heat interchange with relatively cold liquid to effect the subcooling, and in which the relatively cold liquid is obtained by expanding to a lower pressure a portion of the subcooled converted liquid hydrogen.

4. Method of producing and storing liquid hydrogen as defined in claim 3 in which relatively cold liquid vaporized during the subcooling step is passed through the heat exchange zone in countercurrent heat interchange with compressed hydrogen and is then compressed to provide a portion of the compressed hydrogen.

5. The combination of a hydrogen liquefaction and conversion apparatus and a storage vessel for receiving and storing converted liquid hydrogen produced by the apparatus; the hydrogen liquefaction and conversion apparatus comprising a compressor, a multipass heat exchanger, means forming a chamber for liquid hydrogen, a catalyst in the chamber for accelerating conversion of ortho hydrogen to para hydrogen, first conduit means for connecting the discharge of the compressor through one pass of the heat exchanger to the chamber, an expansion value in the first conduit means, and means for maintaining the pressure in the chamber above atmospheric pressure; liquid transfer means connected between the chamber and the storage vessel for transferring converted liquid hydrogen from the chamber into the storage vessel; an expansion valve located in the liquid transfer means adjacent the storage vessel; and second conduit means for connecting the vapor space of the storage vessel through a second pass of the heat exchanger to an inlet of the compressor means.

6. The combination of a hydrogen liquefaction and conversion apparatus and a storage vessel for receiving and storing converted liquid hydrogen produced by the apparatus; the hydrogen liquefaction and conversion apparatus comprising a compressor, a multipass heat exchanger, means forming a chamber for liquid hydrogen, a catalyst in the chamber for accelerating conversion of ortho hydrogen to para hydrogen, first conduit means for connecting the discharge of the compressor through one pass of the heat exchanger to the chamber, an expansion valve in the first conduit means, and means for maintaining the pressure in the chamber above atmospheric pressure; a subcooler; means for passing converted liquid hydrogen from the chamber through the subcooler; a transfer line connected between the subcooler and the storage vessel for transferring converted liquid hydrogen from the subcooler into the storage vessel, an expansion valve located in the transfer line adjacent the storage vessel, and second conduit means for connecting the vapor space of the storage vessel through a second pass of the heat exchanger to an inlet of the compressor means.

7. In combination, multistage compressor means including a high pressure inlet and a low pressure inlet, a multipass heat exchanger, means defining a chamber, a catalyst in the chamber for accelerating conversion of ortho hydrogen to para hydrogen, first conduit means for connecting the discharge of the compressor means through one pass of the heat exchanger to the chamber, an expansion valve in the first conduit means, means for maintaining the pressure in the chamber above atmospheric pressure, second conduit means for connecting the chamber through a second pass of the heat exchanger to the high pressure inlet of the compressor means, a storage vessel, liquid transfer means connected between the chamber and the storage vessel, an expansion valve located in the transfer means adjacent the storage vessel, third conduit means for connecting the vapor space of the storage vessel through a third pass of the heat exchanger to the low pressure inlet of the compressor means.

References Cited in the file of this patent

UNITED STATES PATENTS

| | | |
|---|---|---|
| 1,574,119 | Seligmann | Feb. 23, 1926 |
| 2,937,076 | Class et al. | May 17, 1960 |

OTHER REFERENCES

Perry: "Chemical Engineers Handbook," 2nd edition, pages 2626, 2635–2638 (1941).

Perry: "Chemical Engineering Handbook," 3rd edition, pages 1701–1717 (1950).

Coplen: "Journal of the American Rocket Society," vol. 22, No. 6, pages 309–322, November–December 1952.

Grilly: "Review of Scientific Instruments," vol. 24, pages 1–4, January 1953; pages 899, 900, October 1953.

Weitzel et al.: "Review of Scientific Instruments," vol. 27, pages 57, 58 (1956).

Weitzel et al.: "Journal of Research, U.S. Bureau of Standards," vol. 60, pages 221–227, March 1958. (This article also reported as AEC Document NBS 5046, Technical Memo No. 45, Feb. 15, 1957.)

UNITED STATES PATENT OFFICE
CERTIFICATE OF CORRECTION

Patent No. 3,094,390                                            June 18, 1963

Peter C. Vander Arend

It is hereby certified that error appears in the above numbered patent requiring correction and that the said Letters Patent should read as corrected below.

Column 5, line 13, for "prefectly" read -- perfectly --; column 7, line 58, for "value" read -- valve --.

Signed and sealed this 21st day of January 1964.

(SEAL)
Attest:
ERNEST W. SWIDER

EDWIN L. REYNOLDS

Attesting Officer                                Acting    Commissioner of Patents